United States Patent [19]

Goto

[11] Patent Number: 5,704,702

[45] Date of Patent: *Jan. 6, 1998

[54] AUTOMATIC LIGHTING EQUIPMENT AND AUTOMATIC LIGHTING SYSTEM USING SAID EQUIPMENT

[75] Inventor: Teruki Goto, Saitama, Japan

[73] Assignee: Kabushiki Kaisha S & T Studio, Tokyo, Japan

[*] Notice: The term of this patent shall not extend beyond the expiration date of Pat. No. 5,481,439.

[21] Appl. No.: 506,744

[22] Filed: Jul. 26, 1995

Related U.S. Application Data

[63] Continuation of Ser. No. 237,507, May 3, 1994, Pat. No. 5,481,439.

[30] Foreign Application Priority Data

| May 19, 1993 | [JP] | Japan | 5-116898 |
| Dec. 27, 1993 | [JP] | Japan | 5-330929 |

[51] Int. Cl.[6] ............................................. G03B 15/02
[52] U.S. Cl. .................. 362/5; 362/11; 362/271; 362/419; 362/428; 356/222; 396/4
[58] Field of Search ............................. 362/5, 11, 12, 362/419, 428, 270, 271, 272, 233, 285, 287, 802; 354/126, 148, 75, 76, 89, 290, 127.1; 356/222; 396/4

[56] References Cited

U.S. PATENT DOCUMENTS

| 3,375,362 | 3/1968 | Klippert | 362/272 |
| 3,378,678 | 4/1968 | DeGroff | 362/5 |
| 3,688,676 | 9/1972 | Cruickshank | 362/126 |
| 3,845,351 | 10/1974 | Ballmoos et al. | 362/253 |
| 5,093,769 | 3/1992 | Luntsford | 362/419 |
| 5,347,431 | 9/1994 | Blackwell et al. | 362/11 |

FOREIGN PATENT DOCUMENTS

| 133213 | 10/1951 | Sweden | 362/11 |

*Primary Examiner*—Ira S. Lazarus
*Assistant Examiner*—Thomas M. Sember
*Attorney, Agent, or Firm*—Jordon and Hamburg

[57] ABSTRACT

An automatic lighting system simplifies reproduction of desired lighting conditions by use of a computer which compares characteristics of an actual subject to prestored data representing light locations for preferred lighting of a similar mimic subject, and orients mounted lighting fixtures accordingly. A plurality of light fixtures are mounted for movement on frame. Ideal locations of the light fixtures are determined for mimic subjects of various characteristics by a skilled photographer. The location and illumination data are then stored in computer memory. When an actual subject is placed in the same position as the mimic subject for photographing thereof, data for a mimic subject having characteristics closest to the actual subject are selected from the prestored data, and the light fixtures are automatically oriented accordingly in response to computer control. To assure proper orientation and illumination by the light fixtures, a hemispherical sensor including on its surface a plurality of photodiodes may be placed in the position of the subject the output of which is compared against stored data.

4 Claims, 7 Drawing Sheets

AUTOMATIC LIGHTING EQUIPMENT AND AUTOMATIC LIGHTING SYSTEM USING SAID EQUIPMENT

This is a continuation of application Ser. No. 08/237,507, filed May 3, 1994, now U.S. Pat. No. 5,481,439.

BACKGROUND OF THE INVENTION

The present invention relates to an automatic lighting system in which a lighting work in photographing in a studio is effectively and promptly performed in such a manner that a present lighting technique of professional photographers is made stored in a computer, whereby a high-quality photograph in conformity to the lighting usually performed by professional photographers can be obtained; and to an automatic lighting equipment for performing that system.

What most affects photographing, and particularly the quality and work-hours of commercial photographing is lighting work. The lighting work generally has been such that a photographer has moved back/forth and right/left a plurality of lights to find a lighting condition which he has considered most suitable and took a picture at the position satisfying the condition. However, the work to find the lighting position which he has considered most suitable has been not easy and conventionally taken one to two hours.

SUMMARY OF THE INVENTION

An object of the present invention is to provide an automatic lighting system which firstly, in a lighting work in photographing, makes it possible for even those who have not a professional technique to produce very easily a lighting condition limitlessly close to a lighting technique of professional photographers, and which secondly, makes it possible to shorten significantly photographing time and to provide a uniform lighting without developing variation by individual photograph works; and to provide an automatic lighting equipment employing that system.

The lighting equipment comprises a frame; a top lighting fixture which is provided on or separately from the frame, slidable right and left along a circular arc-shaped guide rail movable back and forth of the frame, and swivelable back and forth on the circular arc-shaped guide rail. Lower lighting fixtures are provided as a pair on both sides of the frame, slidable up and down along circular arc-shaped holding fixtures with the center of the frame taken as their center, and rotatable within a range of $-10°$ to $+35°$ when the range is straddled by a center line toward the center of the frame. A hemispherical sensor is provided at the center of the frame, thereby allowing the automatic check of luminous energy.

The circular arc-shaped holding fixtures comprise in combination a link mechanism and a telescopic mechanism, or in combination telescopic mechanisms crossing to each other.

Using such equipment, a mimic subject having a basic size and configuration frequently used in photographing is placed on the frame; its lighting position and luminous energy are adjusted by a photographer having an expertise to obtain an ideal condition; said condition is converted by a position reading device and a photo sensor to an electric signal; an luminous energy to which various portions of the subject are subjected is measured; then, these conditions are stored in a computer. In actual photographing, data are thus automatically selected which are closest to preprogrammed sample data, thereby allowing the lighting work according to said data to be automatically performed.

DESCRIPTION OF THE PREFERRED EMBODIMENTS

With reference to the drawings, a lighting equipment of the present invention will be explained. On the equipment, there are provided three lighting fixtures. That is, one top lighting fixture 1 is provided on the upper side of a frame 4, and two lower lighting fixtures 2 and 3 provided on the both sides of the frame 4. These lighting fixtures are used to irradiate light to a subject (not shown) such as an object placed on the top side 5 of the frame 4 from three sides, that is, from upper side and both sides, so that the subject can be photographed at an optimum position. The frame 4 is allowed to have a width and a strength by which an object having large dimensions, for example, about 500 mm wide, 500 mm long and 500 mm high can be placed on the frame.

The present equipment, in which a subject is placed on the photographing device to photograph as described above, uses computer software as described below to allow high-accuracy photographing. That is, with a mimic subject having a basic size and configuration such as that relatively frequently used in photographing placed on the frame, its lighting (light position and luminous energy) is adjusted by a photographer having expertise to obtain an ideal condition. That condition is converted by a position reading device and a photo sensor to an electric signal, a luminous energy to which various portions of the subject are subjected is measured, and these conditions are stored in computer memory. The same work is repeated by changing the size and configuration of the mimic subject, and then these conditions obtained are also stored as data.

In actual photographing, the size and configuration of the subject are thus automatically selected from that closest to preprogrammed sample data, whereby the lighting work (to control light position and brightness) according to said data is automatically performed. It is more preferable that a control box is placed close to the photographer, which has a function capable of finely adjusting respective brightnesses of three lighting fixtures. Further, the present equipment is adapted for manual operation where uniform photographing is preferably avoided because of the nature of the subject and the like. There is provided a function in which the operation of a preset switch causes the adjustment to be returned to automatic mode.

Figure 1:
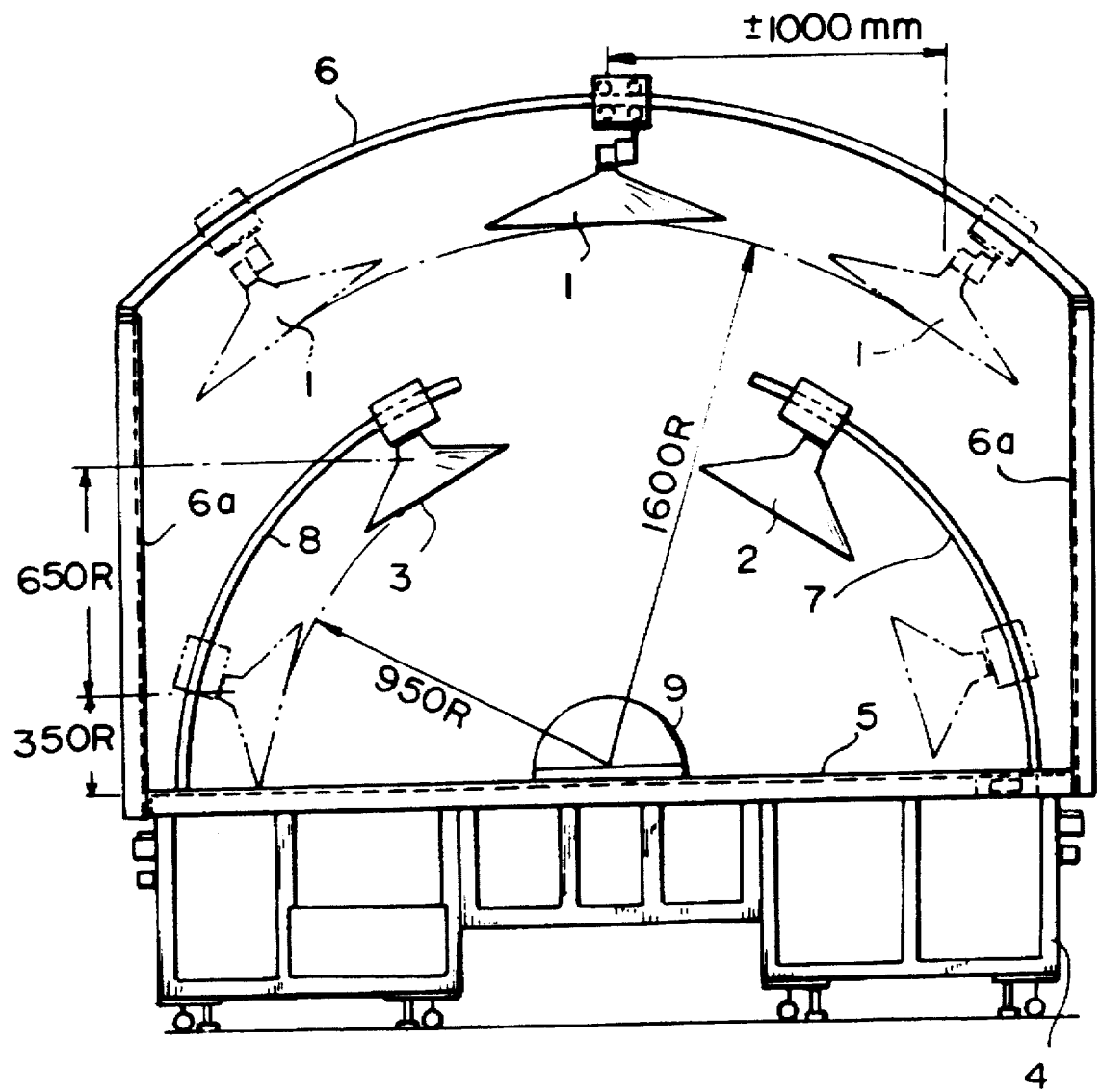
FIG. 1 is a front view of an automatic lighting equipment.
Figure 2:
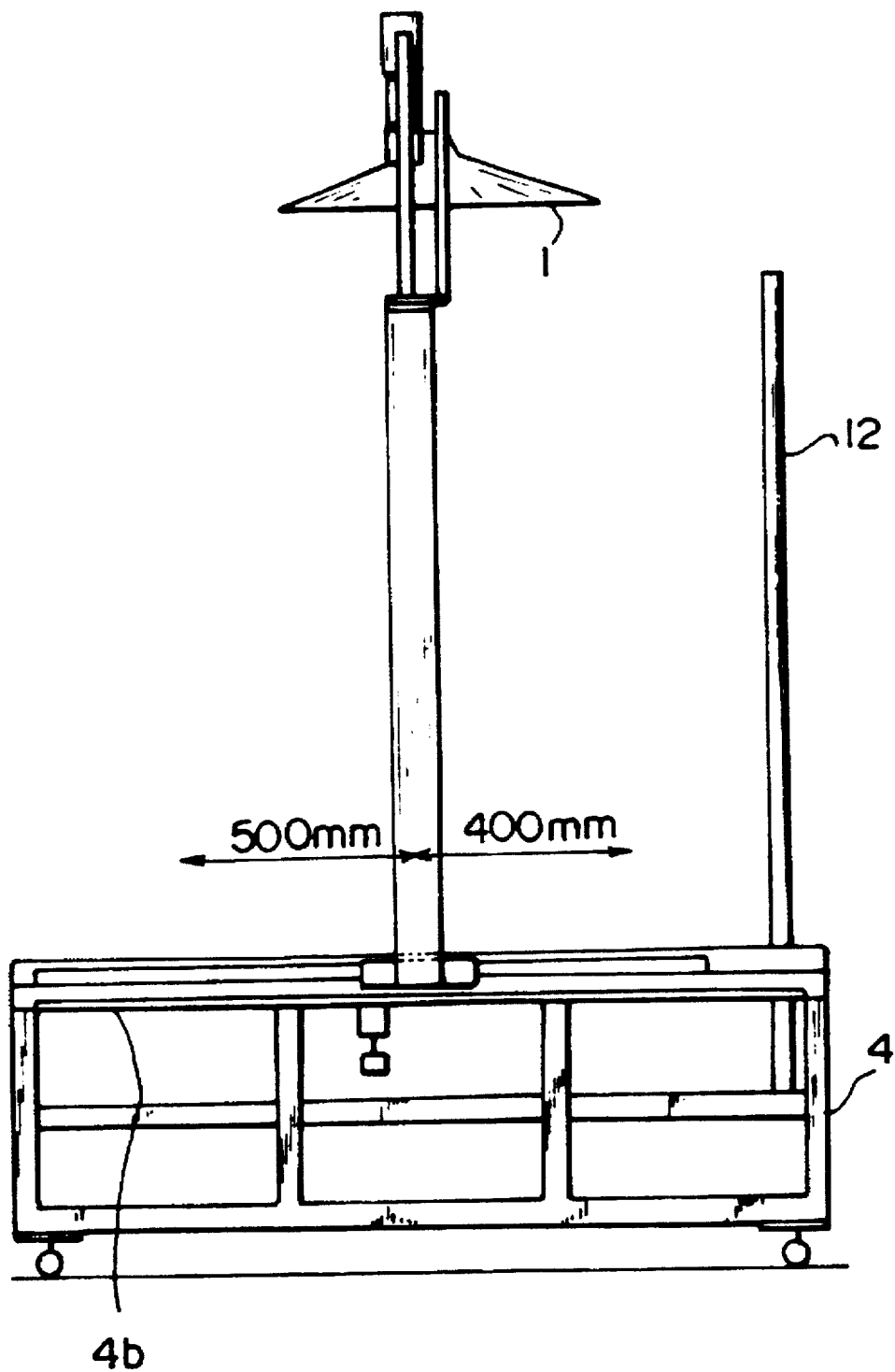
FIG. 2 is a right side view of FIG. 1.
Figure 3:
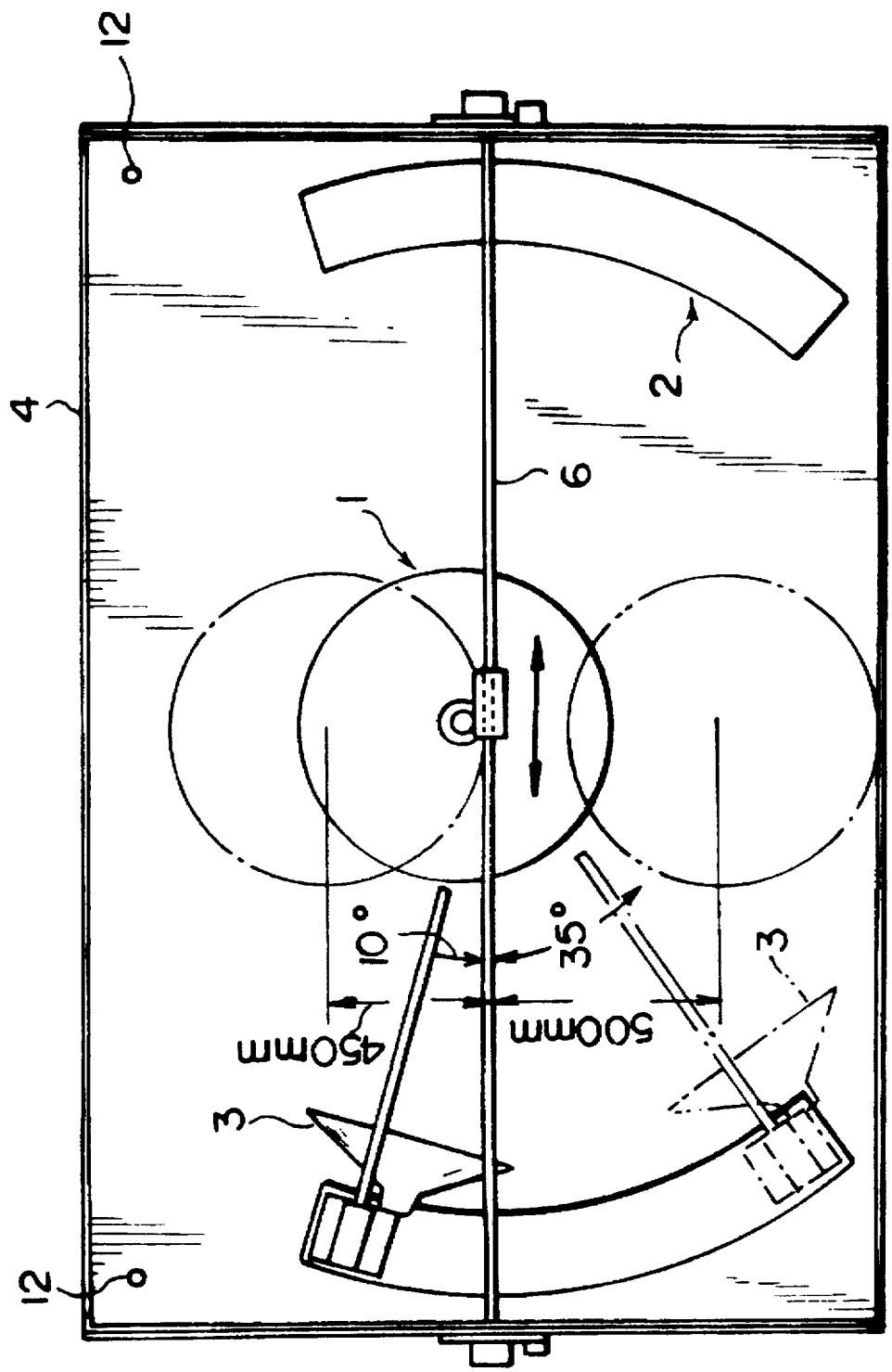
FIG. 3 is a plan view of the embodiment of the present invention of FIG. 1 omitting lighting fixtures 2 and 3 and further showing back paper supporting pillars 12.

With reference to FIG. 2 and following drawings, the present equipment will be explained in detail. As shown in FIG. 2, there are provided one top lighting fixture 1 and two lower lighting fixtures 2 and 3 which are a pair of right and left fixtures, thus three fixtures in total. The top lighting fixture 1 is supported by the arc-shaped guide rail 6 with a radius of about 1600 mm which straddles between pillars 6a and 6a erectly provided on both sides of the frame 4, and movable about 1000 mm right and left from the center on the arc-shaped guide rail 6, as shown in FIG. 1. As shown in FIG. 3, the fixture 1 is slidable about 500 mm forth and about 400 mm back of the center of the frame 4 along a rack gear 4b provided on both sides of the frame 4. Further, as shown by the two-dot chain line in FIG. 1, the fixture 1 is swivelable in the same direction as the slide direction.

The lower lighting fixtures 2 and 3, as shown in FIG. 1, slide about 650 mm upward on the inward circular arc-shaped rail provided on the holding fixtures 7 and 8 having a radius of about 950 mm, with the position (FIG. 1) about 350 mm above the frame 5 taken as a starting point, and move rotatably within a range of −10° to +35° when the range is straddled by a center line toward the center of the frame, as shown in FIG. 3. The frame 4 is basically of stationary, installed type, whose top side 5 is lined with a plywood plate. The numeral 12 indicates back paper supporting pillars erectly provided on the back of the frame 4, to which a back paper is attached to perform photographing.

Figure 6:
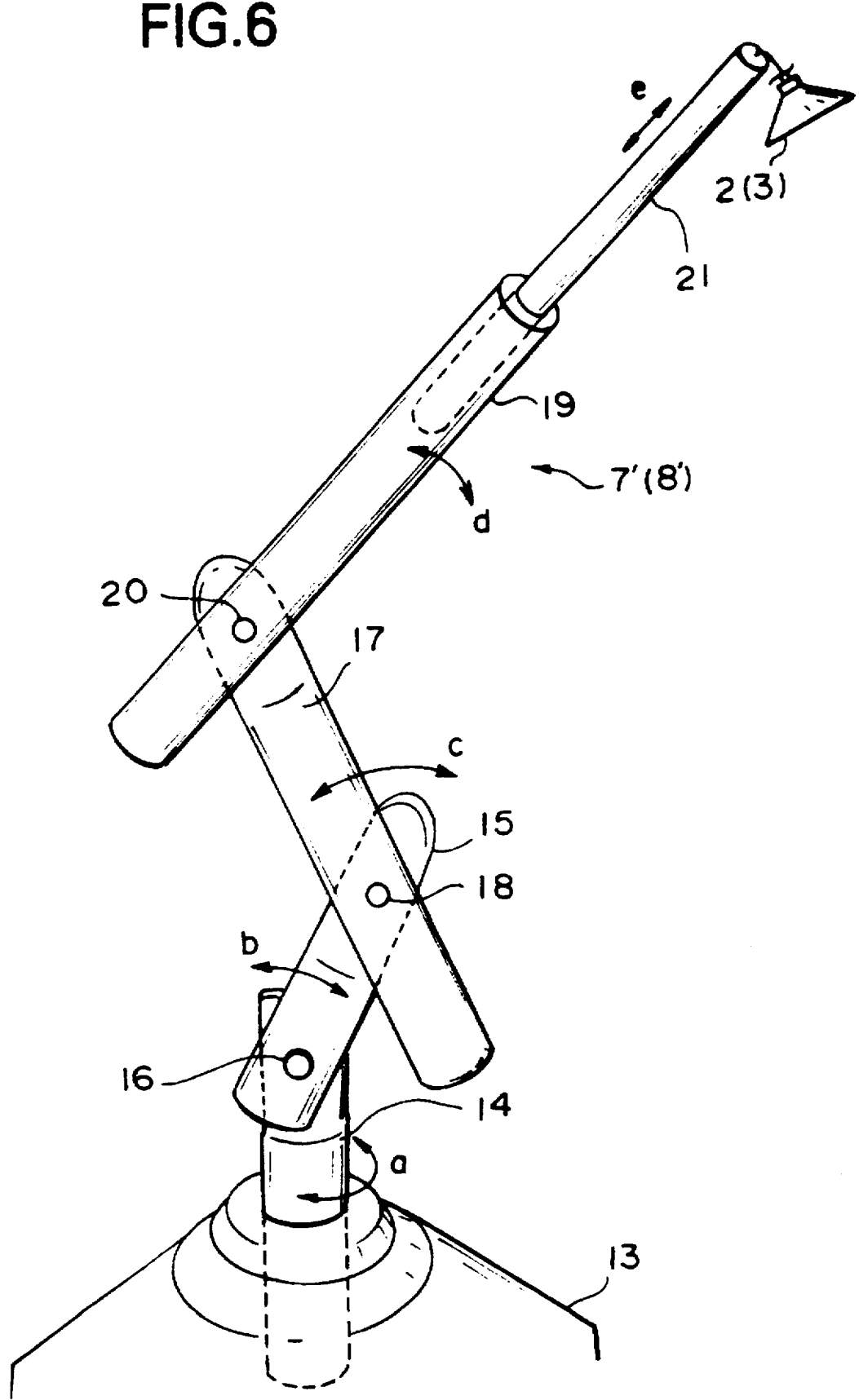
FIG. 6 shows another example of a holding mechanism instead of a circular arc-shaped holding mechanism.
Figure 7:
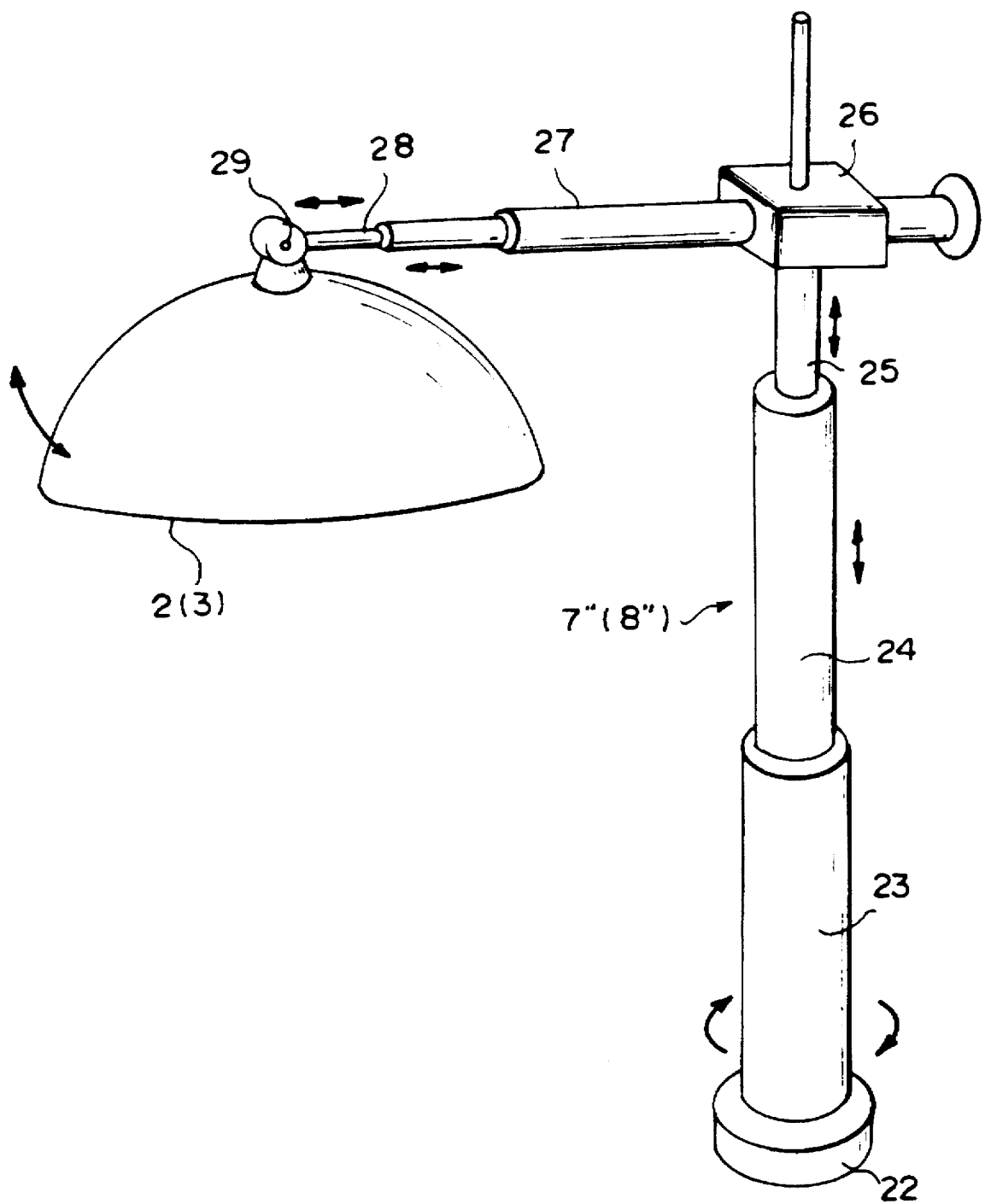
FIG. 7 shows still another example of a holding mechanism instead of a circular arc-shaped holding mechanism.

FIGS. 6 and 7 show another example of the holding fixtures 7 and 8 of the lower lighting fixture 2. In the above-mentioned example, the lower lighting fixture 2, as shown in FIG. 1, slides about 650 mm upward on the inward circular arc-shaped rail provided on the circular arc-shaped holding fixture 7 or 8, with the position (FIG. 1) about 350 mm above the frame 4 taken as a starting point, and moves rotatably within a range of −10° to +35° when the range is straddled by a center line toward the center of the frame, as shown in FIG. 3. On the contrary, the holding fixtures 7' and 8' shown in FIG. 6 utilize a link mechanism and a telescopic mechanism, and are rotatable 360° about their base portion.

In FIG. 6, the numeral 13 indicates a base board provided on the frame 4. On the base board 13, there is provided a base pillar 14 rotatable 360° in the arrow "a" direction with respect to the base board 13. A first link 15 is supported by a pin 16 with respect to the base pillar 14, rotatable 180° in the arrow "b" direction, and mounted fixably at a specified angle position. A second link 17 is supported by a pin 18 with respect to the first link 15, rotatable 360° in the arrow "c" direction, and mounted fixably at a specified angle position. A third link 19 is supported by a pin 20 with respect to the second link 17. The third link 19 is rotatable 360° in the arrow "d" direction about the pin 20, and mounted fixably at a specified rotating position. A fourth link 21 is mounted in a telescopic manner with respect to the third link 19, and expandable/contractible in the arrow "e" direction.

Because of the above-mentioned composition, the lower lighting fixture 2 or 3 mounted at the top end of the fourth link 21 is changeable freely in the horizontal direction and in the upper/lower direction, and easily permitting fine adjustment of its position by expanding/contracting of the top fourth link 21. With the composition, an optimum changing of the position is possible which is equal to that obtained by the holding fixture of the lower lighting fixture having a composition shown in FIG. 1, thereby allowing an optimum lighting to be given to the subject on the frame 4.

FIG. 7 is an example of the holding fixtures 7" and 8" which expand and contract in a telescopic manner and in the longitudinal/transverse direction. In FIG. 7, a base pedestal 22 is mounted on the frame 4, and a first telescopic pipe 23 is rotatably mounted to the pedestal. A second telescopic pipe 24 is fitted expandably/contractibly into the first telescopic pipe 23. A third telescopic pipe 25 is fitted expandably/contractibly into the second telescopic pipe 24. To the third telescopic pipe 25, there is fixedly mounted a square block 26, to which a horizontally-facing telescopic pipe mechanism 27 is mounted. The lighting fixture 2 or 3 is rotatably mounted by a supporting shaft 28 to the top telescopic member.

With such composition, the holding fixtures 7" (or 8") rotates about the base pedestal and expands/contracts up and down end in the transverse direction, end the lighting fixture itself is rotatable about the supporting shaft 28. Accordingly, in a manner similar to the mechanism shown in FIG. 1, a movement having a very high degree of freedom can be performed.

Figure 4A:
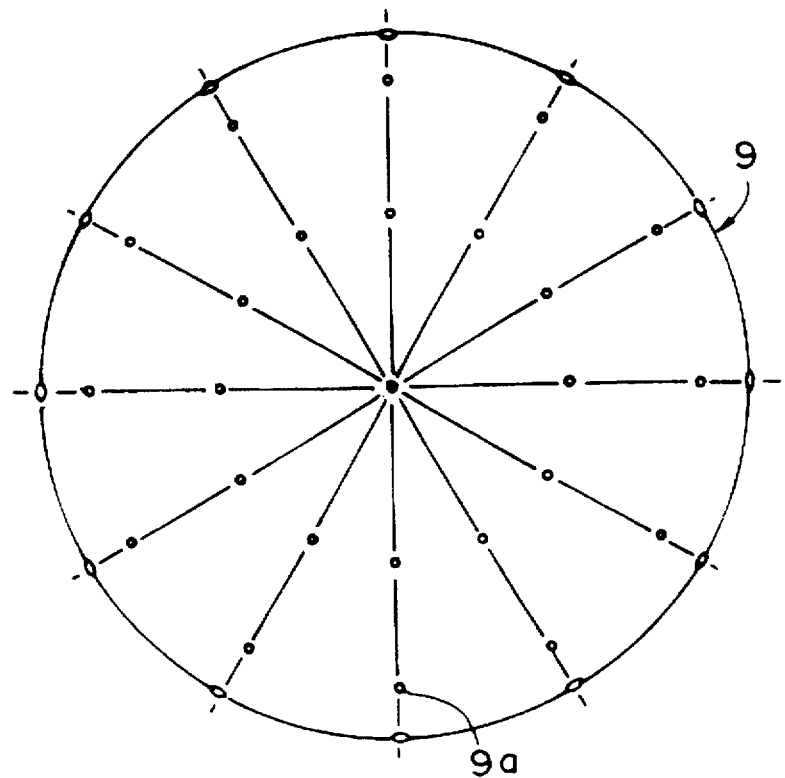
FIG. 4 shows a hemispherical sensor is which (a) is a plan view and (b) is a front view.
Figure 4B:
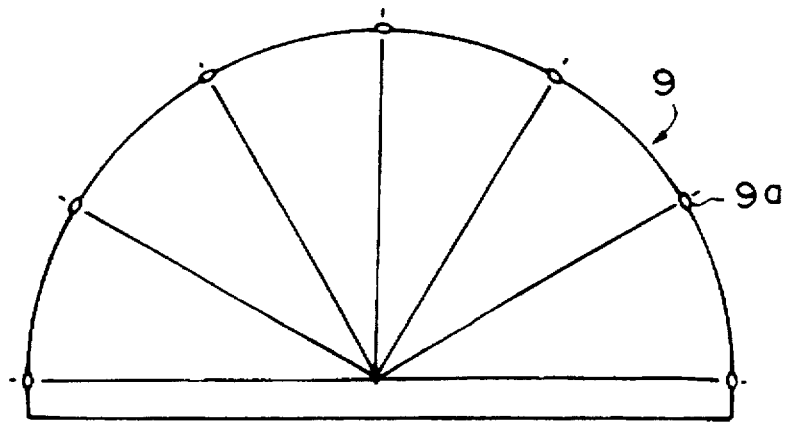

In order to check the brightness after photographing, as shown in FIGS. 4 (a) and 4 (b), on the frame 4, there can be installed a hemispherical sensor 9 on whose spherical surface a plurality of photodiodes 9a are attached, and which also can automatically check luminous energy.

Figure 5:
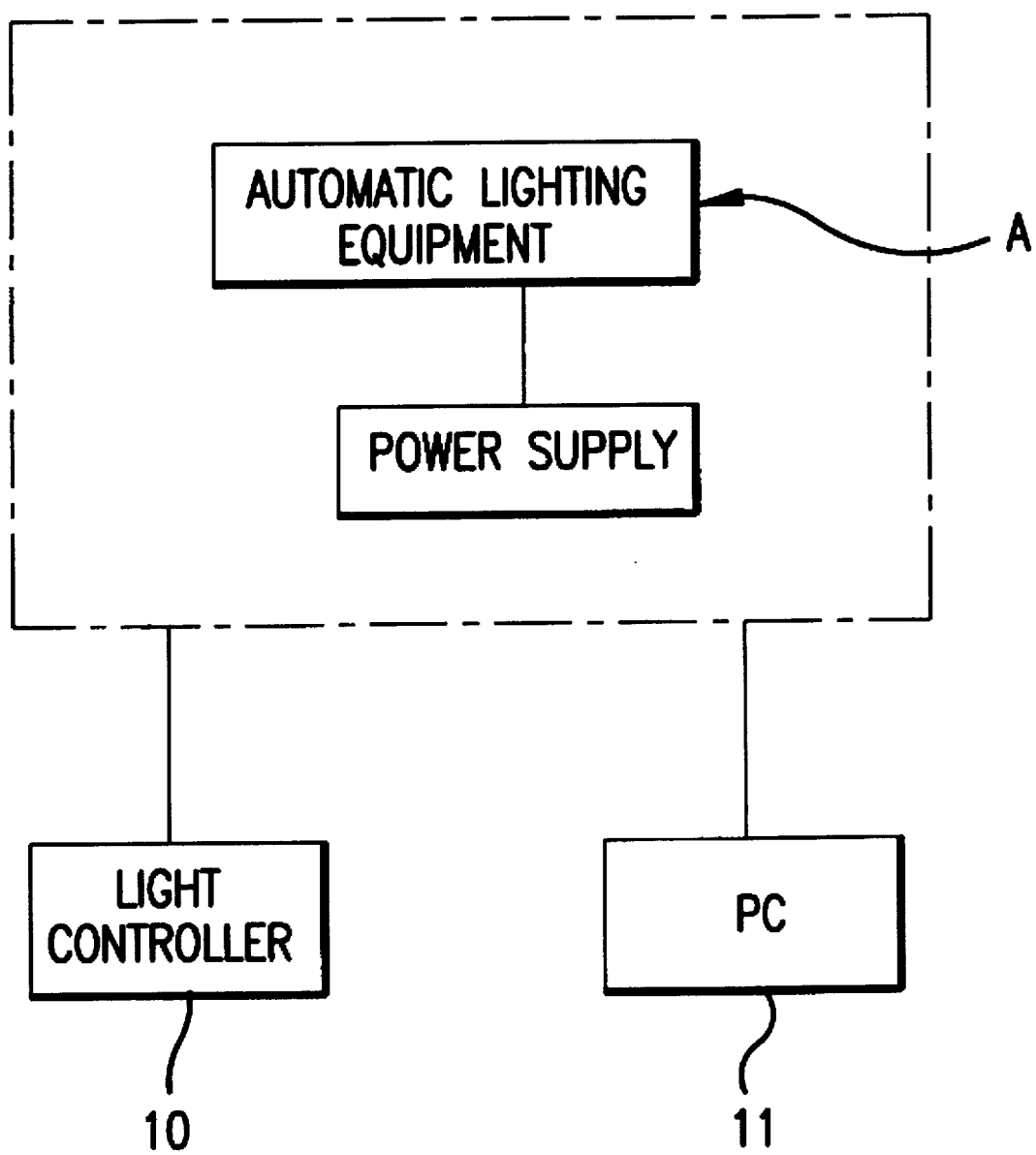
FIG. 5 is a block diagram of a system.

In performing a light control system in which by, the use of the present equipment, the position and angle of the automatic lighting equipment are set, and the set contents are processed by a personal computer, the following fixtures are prepared. FIG. 5 is a schematic block diagram, in which the top lighting fixture 1 and the lower lighting fixtures 2, 3 of the automatic lighting equipment are controlled in position and angle by a light controller 10. A luminous energy (voltage level) is inputted, which together with position and angle are data processed by a personal computer 11, and as required, the contents are outputted. In this case, the top lighting fixture 1 and the lower lighting fixtures 2, 3 are automatically set by the computer control.

In the embodiments of FIG. 1 through FIG. 3, the top lighting fixture 1 is slidably installed on the circular arc-shaped guide rail 6 provided on the frame 4. However, it is possible to separate the circular arc-shaped guide rail 6 from the frame 4, making the guide rail wider and taller. In this manner, the distance between a subject and lighting fixtures can be made large, and thus more lighting fixtures be set, whereby higher quality photographing and larger-subject photographing can be effectively handled.

The lighting equipment comprises a frame 4; a top lighting fixture 1 which is provided on or separately from the frame 4, slidable right and left along a circular arc-shaped guide rail 6 movable back and forth of the frame 4, and swivelable back and forth on the circular arc-shaped guide rail 6; and lower lighting fixtures 2 and 3 which are provided as a pair on both sides of the frame 4, slidable along circular arc-shaped holding fixtures 7 and 8 with the center of the frame 4 taken as their center, and rotatable in both directions when the range is straddled by a center line toward the center of the frame 4; wherein a mimic subject having a basic size and configuration frequently used in photographing is placed on the frame; its lighting position and luminous energy is adjusted by a photographer having an expertise to obtain an ideal condition; said condition is converted by a position reading device and a photo sensor to an electric signal; an luminous energy to which various portions of the subject are subjected is measured; then, these conditions are input to a computer for storage in memory; end in actual photographing, data are thus automatically selected which are closest to preprogrammed sample data, thereby allowing the lighting work according to said data to be automatically performed.

Instead of the circular arc-shaped holding fixture 7 or 8, holding fixture 7' or 8' comprising in combination a link mechanism and a telescopic mechanism, or holding fixture 7" or 8" comprising in combination telescopic mechanisms causes the degree of freedom to be made larger.

In lighting work affecting greatly the quality and work-hours of photographing, firstly, such composition makes it possible for even those who do not possess a professional technique to produce a lighting condition virtually the same as an advanced lighting technique of professional photographers.

Secondly, such composition makes it possible to shorten significantly photographing time and to provide a uniform lighting without developing variation by individual photograph works. For example, a lighting work conventionally requiring one to three hours can be shortened to several seconds.

What is claimed is:

1. An automatic lighting system for lighting a subject area, comprising:

a plurality of lighting means;

support means for supporting said plurality of lighting means proximate said subject area;

means for movably mounting said plurality of lighting means to said support means;

said means for movably mounting including means for permitting a range of motion of lighting means relative to a fixed reference location in said subject area operable to allow selective orientation of said lighting means, each of said lighting means being locatable at a selected one of a plurality of discrete spacial coordinates remote from said fixed reference location;

a plurality of light sensors mounted on a support structure disposable within said subject area, said support structure orienting each of said plurality of light sensors at discrete positions for detecting a distribution of light from said lighting means;

said plurality of light sensors producing a plurality of intensity signals representative of said distribution;

means for storing and recalling levels of said intensity signals; and lighting control means for selectively and remotely setting intensity levels of individual ones of said plurality of lighting means and for automatically controlling said intensity levels to effect substantial correspondence between real-time levels of said intensity signals with recalled levels of said intensity signals.

2. The automatic lighting system according to claim 1, further comprising:

means responsive to said selective orientation of each of said plurality of lighting means for producing position signals, each representative of a respective one of said plurality of discrete spacial coordinates;

means for storing said position signals and means for retrieving said position signals; and automated means, responsive to said position signals retrieved by said means for retrieving, for positioning said lighting means in discrete spacial locations corresponding to said position signals.

3. A method for operating an automatic lighting system which includes a plurality of lights, each selectively positionable at a plurality of discrete spacial coordinates remote from a photographing location, said method comprising the steps of:

positioning a mimic subject which includes particular physical characteristics at approximately said photographing location;

arranging said lights in a particular spacial configuration corresponding to a desired distribution of illumination of said mimic subject;

producing position data representative of said desired spacial configuration and storing said position data;

replacing said mimic subject with a light sensing structure, removably disposable at said photographing location and having a plurality of light sensors disposed thereon for sensing and producing intensity signals representative of said desired distribution of illumination;

storing intensity data representing said intensity signals;

subsequently retrieving said position data and said intensity data;

orienting said lights in a configuration corresponding to said position data;

taking new intensity data using said light sensing structure positioned at said photographing location;

comparing said new intensity data with said intensity data; and adjusting intensity levels of said lights as required to sufficiently reproduce said intensity data.

4. The method according to claim 3, wherein:

the steps of positioning and arranging are repeated for a plurality of mimic subjects and desired illuminations; and said method further includes retrieving said position data and said intensity data representative of one of said mimic subjects having said particular physical characteristics most similar to a real-time actual subject.

* * * * *